United States Patent [19]

Timén

[11] Patent Number: 5,660,025

[45] Date of Patent: Aug. 26, 1997

[54] METHOD FOR PRODUCING CARGO UNITS AND ARRANGEMENT FOR SAME

[75] Inventor: Göran Timén, Stockholm, Sweden

[73] Assignee: Cool Carriers AB, Sweden

[21] Appl. No.: 313,224

[22] PCT Filed: Apr. 2, 1992

[86] PCT No.: PCT/SE92/00212

§ 371 Date: Dec. 7, 1994

§ 102(e) Date: Dec. 7, 1994

[87] PCT Pub. No.: WO93/19987

PCT Pub. Date: Oct. 14, 1993

[51] Int. Cl.$^6$ .................................................. B65B 35/50

[52] U.S. Cl. ................. 53/447; 53/441; 53/556; 53/588; 53/540

[58] Field of Search ............................ 414/676; 53/390, 53/393, 441, 442, 447, 540, 556, 557, 592, 588

[56] References Cited

U.S. PATENT DOCUMENTS

| | | | |
|---|---|---|---|
| 2,655,271 | 10/1953 | Cole et al. | 53/447 X |
| 3,133,386 | 5/1964 | Johnston | 53/118 X |
| 3,217,461 | 11/1965 | Wheelock | 53/390 X |
| 4,067,174 | 1/1978 | Goldstein | 53/556 |
| 4,098,051 | 7/1978 | Cordes et al. | 53/442 |
| 4,209,961 | 7/1980 | Donnelley | 53/556 X |
| 4,546,593 | 10/1985 | Lasscock | 53/441 |
| 4,616,474 | 10/1986 | Morley et al. | 53/556 |

FOREIGN PATENT DOCUMENTS

| | | | |
|---|---|---|---|
| 699236 | 11/1953 | United Kingdom | 53/390 |
| WO92/02415 | 2/1992 | WIPO. | |

OTHER PUBLICATIONS

"Fixture Helps 3M Consolidate Pallets", Package Engineering Magazine, Feb. 1983.

*Primary Examiner*—Daniel Moon
*Attorney, Agent, or Firm*—Merchant, Gould, Smith, Edell, Welter & Schmidt

[57] ABSTRACT

Method and arrangement for loading cargo pieces or objects onto a pallet or the like, wherein the pieces or objects are nonsymmetrical or otherwise have an odd shape, for forming with said pallet a cargo unit having a predetermined shape. The invention is based on the idea to take advantage of gravity on loading the pallets and this is achieved by preparing a specific platform arrangement on a higher level than the pallet bottom level and placing the pallet inside a group of uprights secured to a based means and serving as retainers for a stack of goods placed on the pallet, and arranging adjacent the said higher level receiving means for loaded containers for the goods to be reloaded onto other pallets, upon filling the space above the pallet inside the uprights with goods, wrap a web of stretch film material around the pallet and the goods thereon outside the uprights and after wrapping such stretch film material around the goods stacked on the pallet, lift the pallet and stack of goods as one unit, leaving the uprights behind to slip by the sides of the stack and the inside of the wrapped film and subsequently transport the pallet and cargo unit for loading into the ship hold.

2 Claims, 3 Drawing Sheets

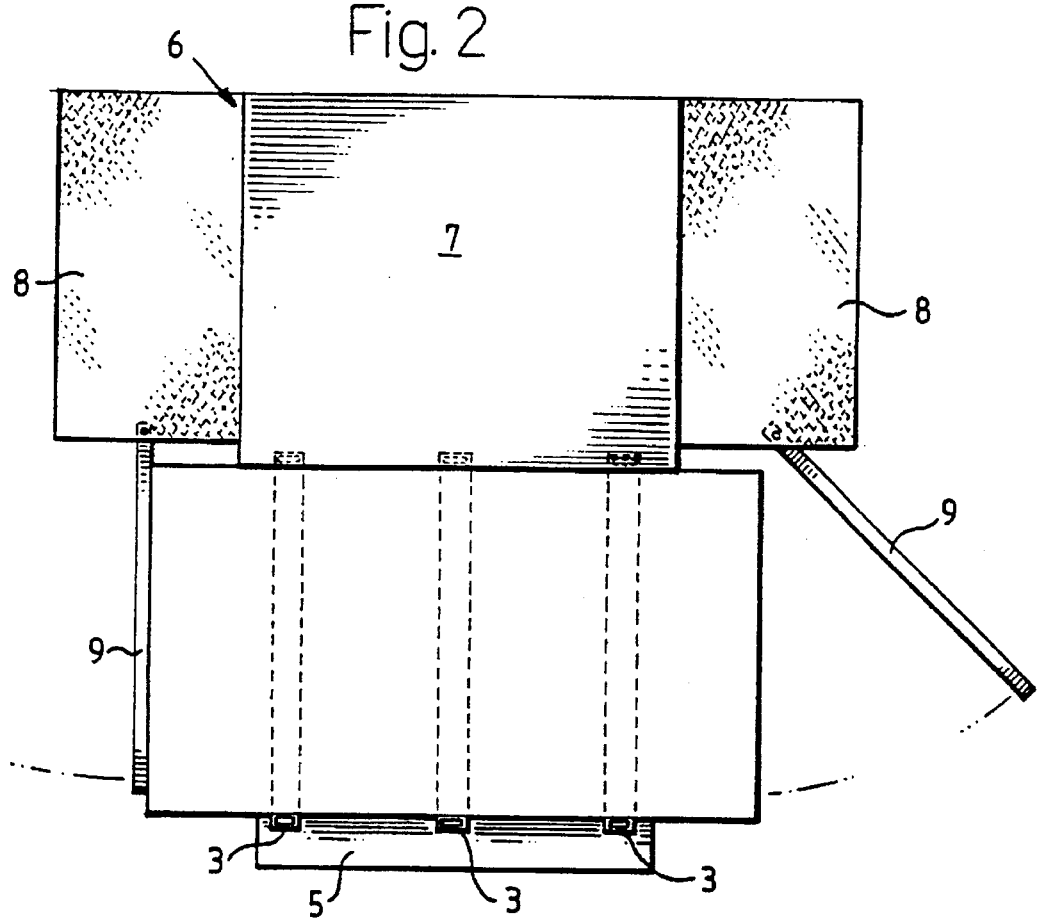
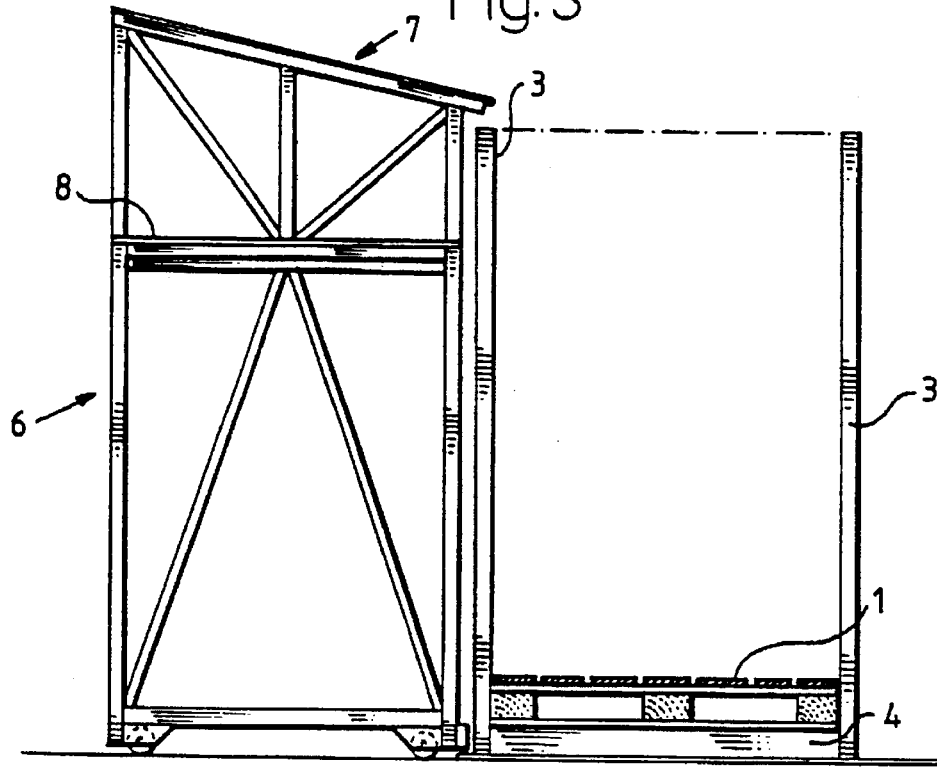

METHOD FOR PRODUCING CARGO UNITS AND ARRANGEMENT FOR SAME

TECHNICAL FIELD OF THE INVENTION

This invention relates to a method and arrangement for packing and producing cargo or shipping units of a number of smaller units, e.g. and preferably pieces of beef or other meat pieces.

BACKGROUND OF THE INVENTION

Meat such as so called quarter beef, i.e. fourth parts of a beef carcass, are today manually handled and carried from a land transporter, a truck or the like to shipping pallets where the beef pieces are stacked and subsequently wrapped or strapped.

The manual labor is extremely hard as each piece of meat weighs at least 100 kgs and often up towards 130 kgs. The meat pieces are frozen and they tend to get an exterior covering of ice or frost, which naturally makes the handling more diffi_ult. Even if three or four men carry each piece, they are not able to stack such heavy pieces very high on a pallet, and the cargo thus placed on each pallet is normally rather low even if supporting uprights or frame elements are placed around the pallet.

BACKGROUND OF THE INVENTION

In sea transport it is an ambition to use the available hold space to the fullest extent and not only to fill the deck areas completely but also to fill the vertical space between the decks. On using manually stacked pallets as described above, the full vertical space can be utilized only if there are arranged rack or shelf systems between the decks so as to allow loading of two or more stacked meat pieces pallets the one above the other on each floor. Such systems involve a lot of extra work in installing and dismantling and hold up the loading and unloading as the rack sections adjacent the hatches normally have to be erected and dismantled respectively before the racks remote from the hatches can be loaded or unloaded.

One important object of this invention is to bring about a method and an arrangement permitting a practical utilization of the total available hold space without the need of rack systems or the like.

Another important object is to bring about a handling equipment minimizing the manual lifting and heaving and allowing stacking on pallets up to normal hold height thus enabling filling the hold to capacity with one layer pallets on each deck.

Still another object is to bring about a new system for securing the stacked load on the pallets.

SUMMARY OF THE INVENTION

The basic idea behind the invention is to take advantage of gravity on loading the pallets/and this is achieved by preparing a specific platform arrangement on a higher level than the pallet bottom level and placing the pallet inside a group of uprights serving as retainers for a stack of goods placed on the pallet, said uprights being secured to a base means, and arranging adjacent the said higher level receiving means for pre-loaded transport containers for the goods to be reloaded onto other pallets preferably shipping pallets, upon filling the space above the said pallet inside the uprights with goods, wrap a web of stretch film material around the pallet and the goods thereon outside the uprights and after wrapping such stretch film material around the goods stacked on the pallet, lift the pallet and stack of goods as one unit, leaving the uprights behind to slip by the sides of the stack and the inside of the wrapped film and subsequently transport the pallet and cargo unit for loading into a ship hold or the like.

BRIEF DESCRIPTION OF THE DRAWINGS

A preferred embodiment of the arrangment and system for performing the method according to the invention will be described below with references to the accompanying drawings, in which, FIG. 2 is a schematic top view of the arrangement according to FIG. 1, with supporting doors added, FIG. 3 is an end view or the arrangement according to FIGS. 1 and 2.

DETAILED DESCRIPTION OF THE PREFERRED EMBODIMENT

Figure 1:
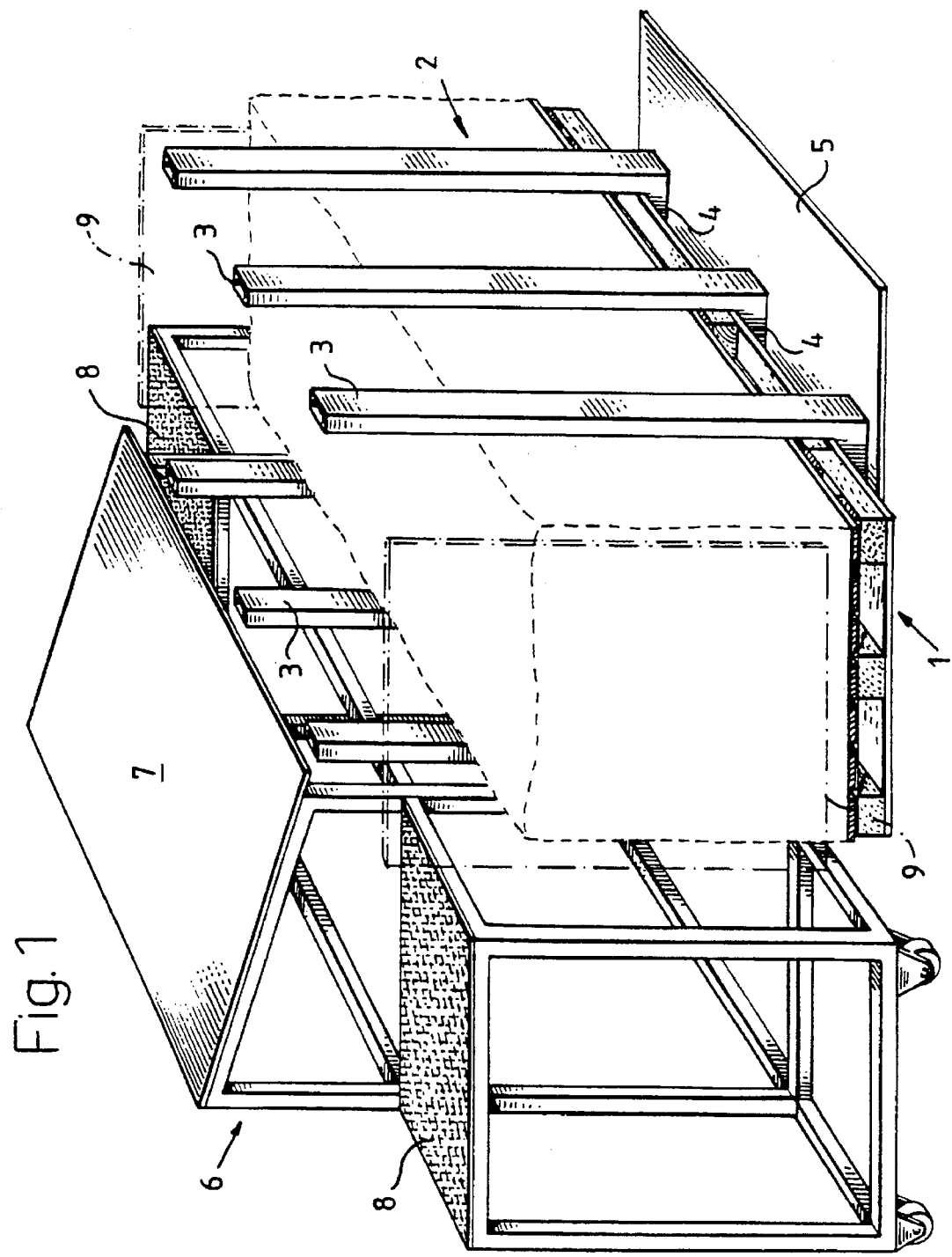
FIG. 1 is a schematic perspective view of an arrangement with the different details localized for receiving pieces of cargo.

The pallet 1 to be used, is a so called shipping pallet having the dimensions of 1200×2100 millimeters and so arranged that it may be forklifted from all four sides.

The pallet shown is an all wood construction with lengthwise boards carried by crosswise boards in turn resting on spacer blocks secured to bottom slats, the spaces between the blocks intended to receive fork lift forks.

The arrangement as a whole is normally localized inside a building. On the floor stands a jig 2 including a number of uprights 3, the uprights being arranged in pairs with a connecting web portion 4 at their lower ends. A plate 5 is secured to the downwardly facing side of the web portions and extends outside the jig like an apron for reasons given below.

The pallet 1 is to be inserted between the uprights 3 resting on the web portions 4, with the crosswise boards and spacer blocks alingned with the web portions 4.

A wheeled scaffolding construction designated 6 is placed alongside the jig 2 and said construction includes a central obliquely arranged slip plane 7 having a length roughly corresponding to the length of the pallet 1 inside the uprights 3. At each end of the slip plane 7 there is a working platform 8 for the workers handling the loading. Hinged on the scaffolding there are also two support doors 9, see FIGS. 2 and 3, swingable to a position indicated in FIG. 2, in which the doors cover the open space above the pallet 1 and between the uprights 3 an each direction and serve as abutment surfaces on loading the pallet.

The arrangment according to FIGS. 1–3 is adapted to be served by a fork lift device or the like hoisting device able to hoist a suitable transport container with an openable side or end to the level of the upper end of the slip plane 7 to enable the workers to seize the pieces of meat and pull them onto the slip plane 7 and as the pieces slide downwardly direct and swing same so they skid and fall onto the pallet guided into the desired position. By adapting the vertical position of the transport container to the upper end of the slip plane so that the uppermost layer of pieces to be loaded is just above the said slip plane end, no lifting at all is necessary, only pulling out and guiding of the said pieces.

Figure 4:
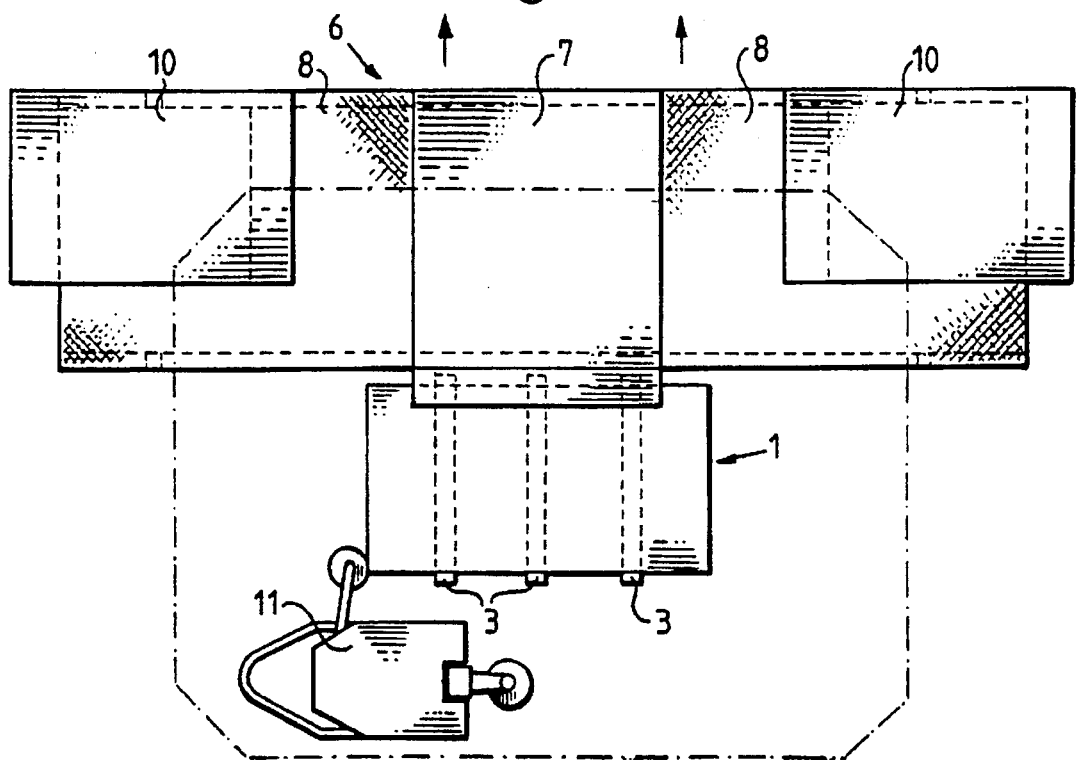
FIG. 4 is a top view of a slightly modified embodiment including rack means for carrying containers to be unloaded and a wrapping machine.

In the embodiment according to FIG. 4, a seat 10 for a transport container is arranged at each side of the slip plane 7 and on each such platform a container may be placed for unloading. The platforms shown are rigidly connected with the platforms, but they may be constructed to move as the contents therein diminish so the pieces to be seized always are situated at approximately the same level as the slip plane upper end.

When the space on the pallet 1 and inside the uprights 3 and the doors 9, is filled up to the desired level, normally above the cargo level indicated by dash lines in FIG. 1, the scaffolding construction 6 with slip plane 7 and the platform is moved away from the jig so as to give room for a stretch film wrapping robot designated 11 in FIG. 4 and arranged to, in per se known way, wrap the cargo pieces accumulated on the pallet 1 with pre stretched film. Starting from below the robot in succession winds layer after layer around the pallet and the lowermost pieces and subsequently upwardly around the cargo and in doing so also covers the outsides of the uprights 3. When the wrapping is finished, the lead unit is ready for transport. By inserting the forks of a fork lift truck or the like fork equipped device into either of the spaces of the pallet 1 and lifting the same, the pallet with its cargo will move upwardly relatively to the jig 2 and its uprights 3, as the jig is held down by the wheels of the fork truck resting on the apron plate 5. The uprights slide out from between the stacked cargo pieces and the enclosing stretch film without hindrance as the lead unit is lifted.

As soon as the scaffolding construction 6 with the platforms is moved back in position and a cargo container is hoisted up at the rear end of the slip plane and a new pallet 1 is inserted inside the uprights 3, the loading of next pallet can start.

In another embodiment, not shown, the jig device may be movable relatively to the scaffolding construction and be rotatable to permit stretch film wrapping by means of a stationary wrapping device.

Under certain circumstances it might be necessary and economical to stack also cargo units achieved by means of the method described above one upon the other. As the cargo units lack upper load carrying abutments it is necessary to complete the units with a load carrying and distributing frame. An embodiment of such a frame is illustrated in FIG. 5.

Figure 5:
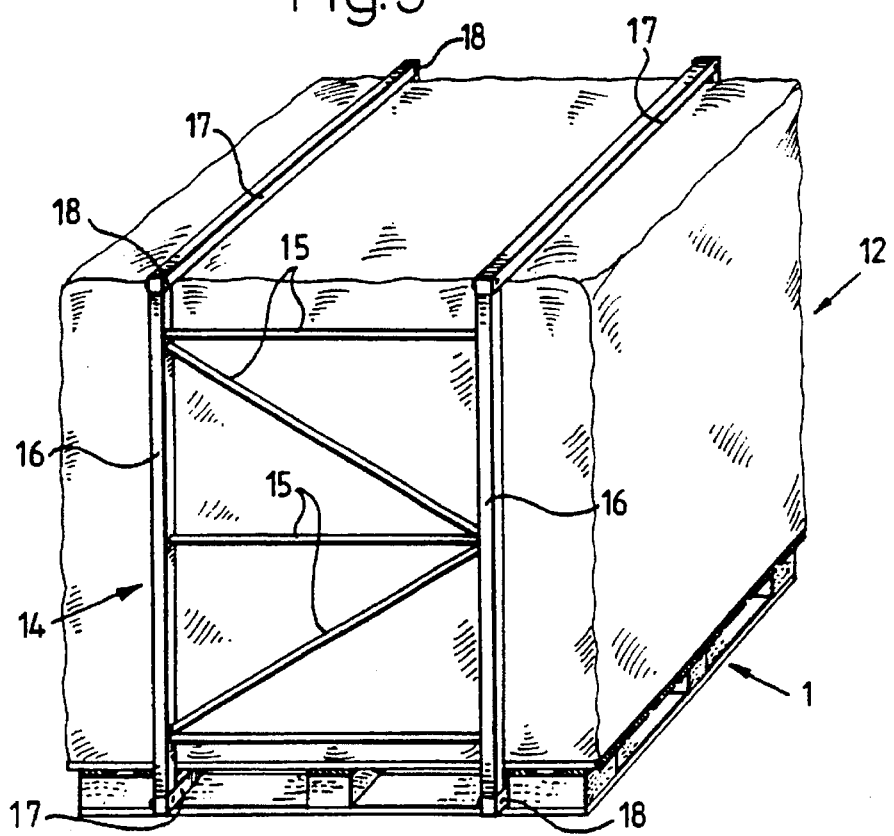
FIG. 5 is a perspective view of a special stacking frame for attaching to the shipping unit.

The loaded and wrapped cargo unit designated 12 including the load carrying pallet 1 is, according to FIG. 5, completed with a stacking permitting frame. The frame includes six parts, two end parts 14 having stabilizing braces 15 between vertical struts 16 and pairs of upper and lower supporting girders 17 interconnecting the end parts 14. The girders are connected to the end part struts by means of bolt and nut connections 18 and the frame, which allows the use of forklifts, is easily assembled and disassembled before and after use, respectively.

I claim:

1. A method for loading a pallet with cargo including cargo pieces each of which has an odd shape and forming cargo units to be fitted in a predefined area, the method comprising the steps of:

providing jig means, for loading the pallet, the jig means having a plurality of uprights projecting upwardly;

placing the pallet to be loaded on the jig means inside the uprights;

providing a scaffolding construction including an inclined slip plane board having a slope towards a space above the pallet and inside the uprights, and at least one worker's platform located adjacent to the slip plane board, a worker on the worker's platform seizing the cargo pieces while the cargo pieces slip along the inclined slip plane board and manually adjusting a position and directions of movement of the cargo pieces to make the cargo pieces reach defined areas of a space above the pallet so as to facilitate stacking further cargo pieces above already stacked ones;

wrapping a stretch film material around the stacked cargo pieces outside of the uprights; and lifting the pallet and the stacked cargo pieces thereon as a unit, leaving the uprights to slip by sides of the stacked cargo pieces and pallet as the stacked cargo pieces and pallet are lifted, and to slip inside of the stretch film material as the stretch film material is lifted with the unit.

2. An apparatus for loading a pallet with cargo pieces each of which has a non-symmetrical, irregular shape, comprising:

a pallet;

jig means having a plurality of uprights projecting upwardly for loading the pallet inside the uprights;

a scaffolding construction disposed adjacent to the pallet inside the jig means, the scaffolding construction having an inclined slip plane with a width adapted to a length of the pallet at least one platform located adjacent to the slip plane for supporting a worker adjacent to the slip plane to allow the worker to seize the cargo pieces while the cargo pieces slip along the inclined slip plane and manually adjust a position and directions of movement of the cargo pieces to make the cargo pieces reach defined areas of a space above the pallet, for stacking thereon, and a seat for carrying cargo pieces at a side of the inclined slip plane opposite to the pallet, the jig means and the scaffolding construction being movable relatively to each other; and a wrapping robot for wrapping a stretch film material around the stacked cargo pieces outside of the uprights so as to form a cargo unit whereby the pallet is lifted with the stacked cargo pieces, leaving the uprights to slip by sides of the stacked cargo pieces and pallet as the stacked cargo pieces and pallet are lifted, and to slip inside of the stretch film material as the stretch film material is lifted with the unit.

* * * * *